H. Saloshinsky,
Shoe-Heel Machine,
No. 2,531. Reissued Mar. 26, 1867.
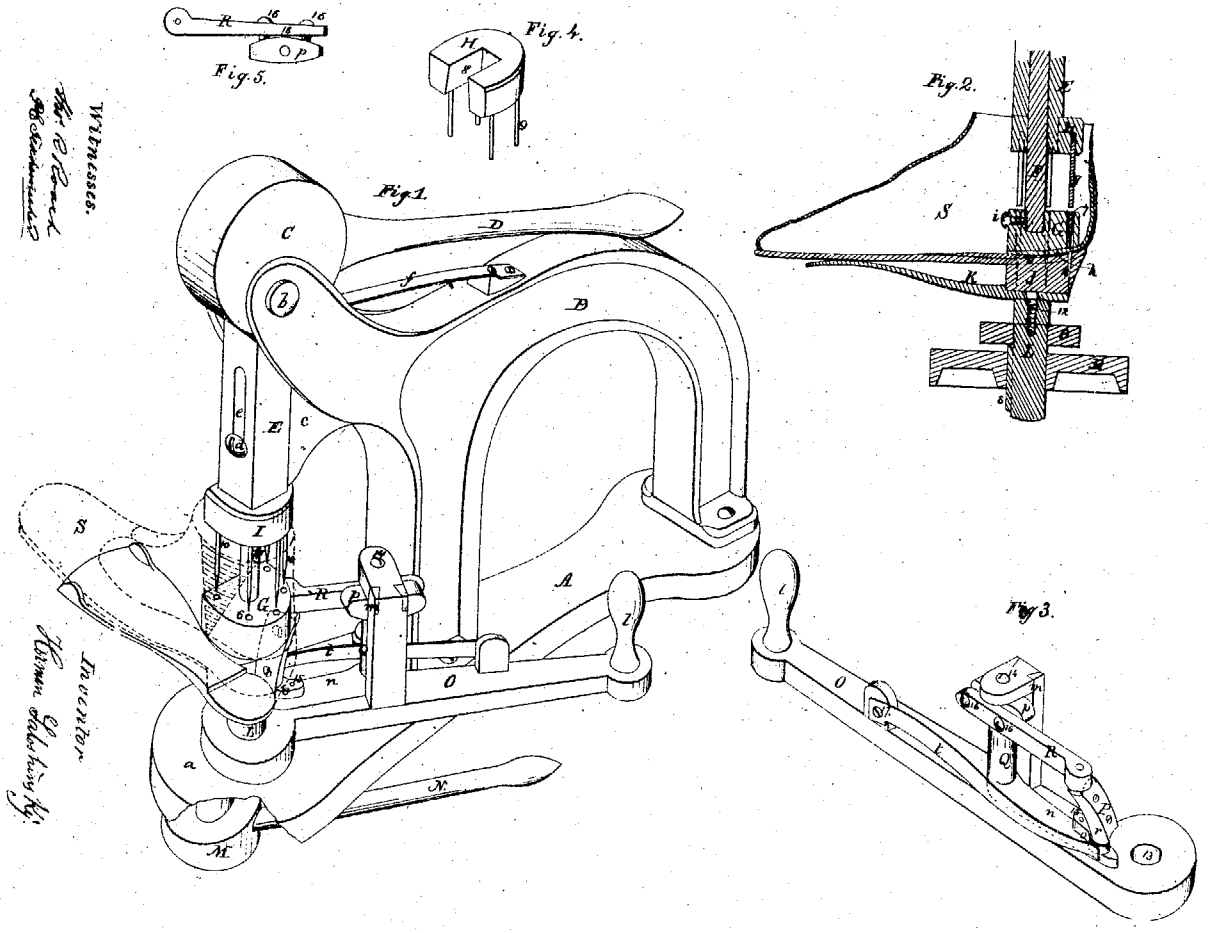
Witnesses.
Thos. P. Roach
J. B. Stickney
Inventor
Herman Saloshinsky

United States Patent Office.

THE Mc KAY HEELING MACHINE COMPANY, ASSIGNEES BY MESNE ASSIGNMENTS OF HERMAN SALOSHINSKY, OF BOSTON, MASSACHUSETTS.

*Letters Patent No.* 27,008, *dated January* 31, 1860; *reissue No.* 2,531, *dated March* 26, 1867.

IMPROVED MACHINE FOR ATTACHING AND FINISHING BOOT HEELS

The Schedule referred to in these Letters Patent and making part of the same.

TO ALL WHOM IT MAY CONCERN:

Be it known that HERMAN SALOSHINSKY, of Boston, in the county of Suffolk, in the State of Massachusetts, invented an Improved Machine for Attaching Heels to Boots and Shoes, and for finishing the same, of which the following is a full, clear, and exact description, reference being had to the accompanying drawings, making part of this specification, in which—

Figure 1 is a perspective view of the machine.

Figure 2 is a section taken through a boot or shoe and a part of the machine showing the boot or shoe, and parts of the machine in position in readiness for the nails to be driven into the heel.

Figure 3 is a perspective view of the apparatus for trimming the heel detached from the rest of the machine.

Figures 4 and 5 are details to be referred to hereafter.

The objects of this invention are to facilitate and cheapen the fastening of heels to boots and shoes, and the forming of the curvilinear outline of the heels when fastened to boots or shoes.

And said invention consists, first, in such an organization and arrangement of parts as will operate together to drive simultaneously several nails from the inside of a boot or shoe through the sole thereof into the heel, for the purpose of uniting the heel to the boot or shoe effectively, expeditiously, and with great neatness; second, in such an organization and arrangement of parts as to combine in one machine means for nailing or pegging a heel to the sole of a boot or shoe, and means which form the curvilinear outline of the heel, by causing the heel to turn with reference to the knife or the knife with reference to the heel.

In the said drawings, A is the bed of the machine, which is secured to a suitable bench or table so that the end *a* projects over the edge of it. From this bed rises the frame B, to which is pivoted at *b* an eccentric cam, C, operated by a lever, D; this cam serves (when thrown over by the lever D) to depress a bar, E, which slides up and down on ways on the front part *c* of the frame B, to which it is secured by a screw, *d*, and slot, *e*. A spring, *f*, attached to the top of the frame B serves to raise the bar E. A rod, F, is attached to the part *c* of the frame B, the screw *d* passing through it and the bar E embracing and sliding over it. To the lower end of this rod F is attached a block, G, which is screwed on to the end of the rod, and is prevented from turning by a small screw, *i*, passing through it, (as shown in fig. 2.) This block is of a form and size corresponding with the heel of the boot to be operated on, and has in it a series of holes, 6, made vertically through it to receive the nails 7, (fig. 2,) which are to be driven through the sole of the boot into the heel. As the size of the boots varies, this block G may be changed. A piece of sheet rubber, *h*, is secured to the lower side of the block G, the holes in which close sufficiently to prevent the nails 7 from dropping through, but it yet yields to let them be forced through as required. The lower end of the bar E is cut away and its sides dove-tailed to correspond with a mortise, 8, in a block, H, (fig. 2, and shown detached in fig. 4,) which is slipped on from one side of the bar, and is prevented from falling by the dove-tailed tenon. This block has projecting from its lower side a series of pins, 9, corresponding in number and position with the holes 6 in the block G. Another block, I, (fig. 1,) of the same form as the block H, also fits the tenon on the end of the bar E, and is intended to be used alternately with the block H; it carries a series of long pins or awls, 10, intended to punch holes through the sole and heel for the reception of the nails 7, (as shown in the heel J at 11, fig. 2.) A rest, K, for the support of the boot, is attached at 12 to the top of a shaft, L, which passes up through the bed A, and is raised as required to compress the heel of the boot against the block G, and to hold it firmly, whilst being operated upon, in the following manner: A cam, M, pivoted to the front of the bed A, alongside of the shaft L, is turned by a lever, M; this cam bears against the lower end of the shaft L, and as it is turned raises the shaft and the rest K; a spline, S, (fig. 2,) on the shaft L, prevents its turning round. A lever, O, shown detached in fig. 3, pivots at 13 on the shaft L, and is swung round horizontally by a handle, *l*, at the outer end of it. This lever carries the knife P for trimming off and shaping the heel. The position or inclination of this knife is adjusted in the following manner to give the required inclination or bevel to the edge of the heel: A vertical post, Q, is pivoted to the top of the lever O, and at 14 to a stud, *m*, rising therefrom. An arm, *n*, projects horizontally from the post Q, and carries at its outer end a block, *o*, pivoted at 15 to the arm *n*. On the upper part of the post Q is a block, *p*, the face 18 of which is rounded off, as shown in fig. 5, so that a horizontal arm, R, which is attached to it by screws 16, may rock over this rounded face as it is adjusted by tightening one of the screws 16 and loosening the other; this alters the position of the arm R with respect to the arm *n*. A block, *r*, which has attached to its face the knife P, is pivoted in the block *o* and in the end of the arm R. As the relative positions of the arms *n* and R are changed, the inclination of the block *r* will be varied to give the required slope or bevel to the heel J. A spring, *t*, secured at 17 to the lever O, presses the arm *n* and the knife P in towards the heel. The lever O and parts connected therewith are raised with the shaft L and rest K.

The following is the operation of the machine: The boot S (shown in red, fig. 1, and in section, fig. 2) is placed upon the rest K with the heel J in its place; the lever N is turned, when the cam M raises the shaft L and rest K, and compresses the heel J against the bottom of the sole of the boot, and the inside of the sole against the block G. (The under side of the block G is rounded to give the proper form to or to conform to the inside of the heel of the boot.) A block, G, of the proper form and size, having been secured to the rod F, and the block I being in place, as shown in fig. 1, the lever D is thrown over, and the eccentric C depresses the bar E and drives the awls 10 down through the holes 6 through the sole *v* of the boot into the heel J, penetrating nearly through the heel, making the holes 11. The lever D is then thrown back, when the spring *f* lifts the bar E and draws out the awls 10. The block I is now removed and the block H, fig. 4, is slipped on to the end of the bar E in place of it; the nails 7 are dropped into the holes 6 in the block G; the lever D is again thrown over, when the pins 9 drive all the nails down into the heel at one operation. Whilst the boot is still securely held in place the lever O is swung round horizontally, and the knife P, which is pressed against the heel by the spring *t*, trims off and shapes the heel as required. The above machine nails on the heel of a boot or shoe and finishes it off, completing the operation at one time in the same machine, without the loss of time which would result from having to change the boot from one machine to another.

*Claim.*

A machine organized so as to operate to drive or force several nails or pegs simultaneously from the inside of a boot or shoe through its sole into the heel thereof, substantially as described.

Also the combination in one machine of means for nailing or pegging the heel of a boot or a shoe to the sole thereof, and means for forming the curvilinear outline of the heel by causing a relative turning movement between the heel and a cutting edge, substantially as described.

JOHN HILL,

*President of the McKay Heeling Machine Company.*

Witnesses:

J. B. CROSBY,

FRANCIS GOULD.